United States Patent
Chong et al.

(10) Patent No.: US 6,760,529 B2
(45) Date of Patent: Jul. 6, 2004

(54) THREE-DIMENSIONAL TAPERED OPTICAL WAVEGUIDES AND METHODS OF MANUFACTURE THEREOF

(75) Inventors: Gabel Chong, Mountain View, CA (US); Achintya Bhowmik, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/014,365

(22) Filed: Dec. 11, 2001

(65) Prior Publication Data

US 2003/0108319 A1 Jun. 12, 2003

(51) Int. Cl.[7] ................................................ G02B 6/30
(52) U.S. Cl. .......................... 385/129; 385/43; 385/49; 385/132; 385/14
(58) Field of Search ............................. 385/14, 43, 49, 385/50, 129–132

(56) References Cited

U.S. PATENT DOCUMENTS

| | | | |
|---|---|---|---|
| 4,420,873 A | 12/1983 | Leonberger et al. | 29/576 E |
| 4,518,219 A | 5/1985 | Leonberger et al. | 350/96.12 |
| 5,436,991 A | 7/1995 | Sunagawa et al. | 385/37 |
| 5,465,860 A | 11/1995 | Fujimoto et al. | 216/24 |
| 5,515,464 A * | 5/1996 | Sheem | 385/49 |
| 5,540,346 A | 7/1996 | Fujimoto et al. | 216/24 |
| 5,825,047 A | 10/1998 | Ajisawa et al. | 257/12 |
| 5,917,980 A | 6/1999 | Yoshimura et al. | 385/129 |
| 5,943,465 A | 8/1999 | Kawaguchi et al. | 385/122 |
| 6,075,908 A | 6/2000 | Paniccia et al. | 385/14 |
| 6,083,843 A | 7/2000 | Ohja et al. | 438/710 |
| 6,147,366 A | 11/2000 | Drottar et al. | 257/82 |
| 6,166,846 A | 12/2000 | Maloney | 359/247 |
| 6,178,281 B1 | 1/2001 | Sautter et al. | 385/129 |
| 6,195,478 B1 | 2/2001 | Fouquet | 385/17 |
| 6,215,577 B1 | 4/2001 | Koehl et al. | 359/261 |
| 6,268,953 B1 | 7/2001 | Maloney | 359/321 |
| 6,269,199 B1 | 7/2001 | Maloney | 385/14 |
| 6,304,706 B1 | 10/2001 | Sugita et al. | 385/129 |
| 6,624,077 B2 * | 9/2003 | White | 438/692 |

OTHER PUBLICATIONS

Farrokh et al., "High Aspect–Ratio Polysilicon Micromachining Technology," *Sensors and Actuators*, 87 (Mar. 2000) pp. 46–51.

Itoh et al., "Low–Loss 1.5% Δ Arrayed Waveguide Grating with Spot–Size Converters," *NTT Photonics Laboratories*, 2 pages.

Mahorowala et al., "In Situ Measurement of RIE Lag During Polysilicon Etching in a Lam TCP using Full Water Interferometry," (http://www.plasma-processing.com/insitu.htm) (Oct. 22, 2001) pp. 1–12.

Moerman et al., "A Review on Fabrication Technologies for the Monolithic Integration of Tapers with III–V Semiconductor Devices," *IEEE Journal of Selected Topics in Quantum Electronics*, vol. 3: No. 6 (Dec. 1997) pp. 1308–1320.

Westerheim et al., "Substrate Bias Effects in High–Aspect–Ratio $SiO_2$ Contact Etching Using an Inductively Coupled Plasma Reactor," *J. Vac. Sci. Technol.*, A 13(3) (May/Jun. 1995) pp. 853–858.

Yonemura et al., "Session FT3–Inductively Coupled Plasma I. Mixed session, Tuesday morning, Oct. 20 South Pacific Ballroom, Aston Wailea," (http://www.aps.org/BAPS-GEC98/abs/S2000.html) (Oct. 22, 2001) pp. 1–4.

* cited by examiner

Primary Examiner—Brian Healy
Assistant Examiner—Kevin S. Wood
(74) Attorney, Agent, or Firm—Marshall, Gerstein & Borun LLP

(57) ABSTRACT

A method for fabricating a three-dimensional tapered optical waveguide and a three-dimensional tapered optical waveguide are shown and described. The fabrication method takes advantage of RIE lag to create a shaped trench in a lower cladding layer that has one end that is wider and deeper and than the opposite end. After the trench is filled with core material, a second RIE process is carried out which takes advantage of reverse RIE lag to etch the core material at a faster rate at the shallower and narrower end and at a slower rate at the wider and deeper end. The result is shaped core of a three-dimensional tapered optical waveguide that is wider and deeper at one end and tapers towards a shallower and narrower end for improved optical signal transmission.

30 Claims, 2 Drawing Sheets

COUPLING LOSS (dB) vs TAPER WIDTH (micron)

COUPLING LOSS (dB) vs TAPER LENGTH (micron)

ETCH GAS: ADDITIVE GAS RATIO vs TOTAL FLOWRATE

ETCH RATE OF SMALL FEATURE : ETCH RATE OF LARGE FEATURE
A ≈ 1-2 (REVERSE RIE LAG)
B ≈ 1 (NO RIE LAG)
C ≈ 0.5 (RIE LAG)

THREE-DIMENSIONAL TAPERED OPTICAL WAVEGUIDES AND METHODS OF MANUFACTURE THEREOF

TECHNICAL FIELD

A three-dimensional tapered waveguide is disclosed for planar lightwave circuits. More specifically, a three-dimensional tapered waveguide is disclosed which is fabricated using two reactive ion etching RIE processes which result in a positive RIE lag affect and a reverse RIE lag affect to create a tapered optical waveguide which has a width and depth at one end that are both greater than the width and depth at a second opposite end.

BACKGROUND

Optical communication systems play an important role in the transmission and processing of data. Due to the large bandwidth of an optical glass fiber, several signals can share the same optical fiber and high transmission rates can be obtained. Thus, in addition to long distance transmission systems, optical fibers also play an important role in advanced computer network and electronic systems.

When using optical fibers in computer and electronic applications, data is transmitted through an optical fiber which, in turn, transmits the data to an optical device (e.g., an optoelectronic device). This optical device is connected or coupled to one or more optical fibers. At the point of coupling, it is extremely important to obtain an efficient coupling or transfer of light between the optical fiber and the optical device. To provide an efficient coupling, the refractive indices of the optical fiber and the optical device must be closely matched. Specifically, a difference in the refractive indexes of the optical fiber and the optical device can result in loss of the optical signal. This problem is also compounded by geometrical differences between the end of the optical fiber and the input end of the optical device.

To solve the geometric mismatch problem, a number of approaches have been attempted. Such approaches include the use of micro lenses and tapered fibers. These approaches have proven unsatisfactory, however, because these solutions present alignment problems resulting in high packaging costs.

Another approach is to insert a separate optical waveguide module between the fiber and the optical device. Although relatively sufficient mode-matching and high coupling efficiencies can be obtained with such modules, small alignment tolerances between the fiber and the optical device hinder efficient and low-cost packaging.

Therefore, the industry has concentrated on the integration of an optical waveguide in the optical device. However, appropriate matching of the input end of the optical waveguide and the optical fiber still remains a problem. Specifically, typical fiber optic cables have a circular cross section with a diameter ranging from 8.2 $\mu$m to 9 $\mu$m. The typical optical waveguide has an input end that does not have a circular cross section and has a width ranging from 2 $\mu$m to 8 $\mu$m. Thus, most waveguides do not provide a suitable match between the width of the waveguide and the diameter of the optical fiber. The difference in geometries between the optical fiber and the optical waveguide results in additional mode mismatch between the optical fiber and the waveguide. As a result, coupling loss occurs which results in poor data transfer and increased power requirements.

Further, because the optical waveguide couples a relatively large optical fiber to a relatively small optical device, the input end of the optical waveguide must be larger than the output end. Thus, a tapering of the waveguide between the input and output ends is required. Technology is available to provide a lateral taper but this approach only changes the width of the waveguide without affecting the height of the waveguide. Thus, a geometric mismatch between the fiber and the waveguide still exists. Other technology involves the use of vertical tapers but, because the width is not tapered, a geometrical mismatch still exists.

Attempts at combining vertical and lateral tapering have been attempted. However, the technologies available require multiple process steps that include different etching processes such as wet etching, dip-etching, dynamic etch mask techniques, stepped etching and diffusion-limiting etch techniques. The combination of these varying and different etching techniques to fabricate a single device is slow and therefore costly. Other tapered waveguides can be fabricated using epitaxial growth techniques which require multiple steps, are slow and also costly.

Therefore, there is a need for an improved method for fabricating three-dimensional tapered waveguides on planar light wave circuits that is easier and less costly than the processes described above which require multiple and different processing steps.

SUMMARY OF THE DISCLOSURE

An improved method for fabricating three-dimensional optical waveguides in a planar lightwave circuit is disclosed.

An improved three-dimensional tapered waveguide incorporated into a planar lightwave circuit is also disclosed.

BRIEF DESCRIPTION OF THE DRAWINGS

The disclosed methods and waveguides will be described more or less diagrammatically in connection with the attached drawings, wherein.

Figure 1:
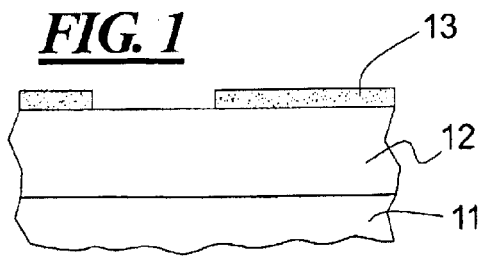
FIG. 1 is a cross-sectional view of a substrate, lower cladding layer and hard mask utilized in the initial fabrication of a three-dimensional waveguide.

It should be understood that the drawings are not to scale and that the embodiments are illustrated by diagrammatic representations and fragmentary views. In certain instances, details which are not necessary for an understanding of the disclosed methods and waveguides or which render other details difficult to perceive have been omitted. It should be understood, of course, that this disclosure is not necessarily limited to the particular embodiments illustrated herein.

DETAILED DESCRIPTION OF THE PRESENTLY PREFERRED EMBODIMENTS

Reactive ion etching techniques are commonly used in the fabrication of semiconductor devices. The chemistry of each system depends upon the materials to be etched. For example, Group III–V semiconductors are typically etched with chlorine (e.g., $Cl_2$), bromine (e.g., HBr), fluoro (e.g., $SiFl_4$) and chloro (e.g, $SiCl_4$) based systems amongst others. The etching of silicon typically requires a fluorine based system (e.g., $SF_6$) with a fluorocarbon (e.g., $CH_2F_2$). The etching of silica typically requires one or more fluorocarbons (e.g., $CF_4$, $C_2F_6$, $C_4F_8$, $C_5F_8$, $C_4F_6$, $CHF_3$ ...). In all of the above-mentioned examples, additive gases such as oxygen and hydrogen can be used in conjunction with the base materials. Typical etching equipment includes inductively coupled systems (ICP) and reactive ion etching systems (RIE).

Currently employed reactive ion etching techniques are characterized by two consequences, both of which have been previously considered to be detrimental. Specifically, when etching a narrow trench (i.e., a high aspect ratio structure) in a cladding or other layer using a RIE process, RIE lag can occur whereby narrower portions of the trench etch more slowly than wider portions of the trench. As a result, a trench is etched with non-vertical sidewalls and an uneven depth.

RIE lag has been attributed to a number of different factors. First, a reduced flux of neutrally charged reactive species at the bottom of a narrow trench or high aspect ratio structure results in a reduced availability of volatile products to remove the etched material. The reduced flux of neutrally charged reactive species is particularly problematic when fluorocarbon etching materials are used. Also, RIE lag has been attributed to the reduction of flux of etch by-products which need to be removed from the bottom of a narrow trench during the etch process. Further, RIE lag is attributable to a reduction in the flux of ions at the bottom of a narrow trench which is particularly problematic when the plasma density of neutrally charged species is low. The use of high-density plasma regimes has been employed to alleviate this particular affect.

Conversely, reverse or inverse RIE lag can also occur which results in a faster etching of high aspect ratio structures or narrow trenches and a slower etching of lower aspect ratio structures or wider trenches. In contrast to RIE lag, reverse RIE lag is attributed to micro-loading affects. Specifically, when the plasma densities are low, the total number of neutral reactive species can very limited for forming etch by-products. Therefore, a larger feature (i.e., lower aspect ratio) can not provide enough reactive species for etching as compared to smaller features (i.e., high aspect ratio structures). One way to alleviate reverse RIE lag in low aspect ratio structures is to decrease the source power, which can result in the control of the amount of neutral species available for the etch reaction. Further, if the overall ion flux is low, there may not be enough ion bombardment for etching in a low aspect ratio structure as compared to a high aspect ratio structure, resulting in reverse RIE lag. This type of reverse RIE lag can be alleviated by increasing the lower electrode power. In the case of fluorocarbon etch systems, polymerization can be controlled by employing additive gases like oxygen or hydrogen. Increased polymerization prevents etching by neutral reactive species and ions which can also result in reverse RIE lag because the larger features can not provide enough net species as compared to the smaller features.

Thus, RIE lag and reverse RIE lag can be caused by a variety of factors and the remedy or means for alleviating both phenomena depends upon the specific etch system being utilized. The methods disclosed herein take advantage of these two effects, RIE lag and reverse RIE lag, which have previously been considered to be detrimental.

Specifically, using a hard mask pattern which leaves a polygonally shaped uncoated area with one end wider than the other, RIE is utilized to etch a trench which is deeper at the wide end of the uncoated area and shallower at the narrow end of the uncoated area. After the trench is filled with core material, reverse RIE lag is utilized to etch the core material so that more core material is etched at the shallower, narrower end and less core material is etched at the wider, deeper end to create a tapered core structure that is wider and deeper at one end and shallower and narrower at the other end.

Various embodiments of the disclosed methods will now be described in conjunction with the figures.

Figure 2:
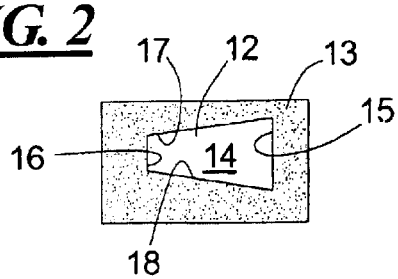
FIG. 2 is a top plan view of the hard mask pattern shown in FIG. 1.

Turning to FIG. 1, a substrate 11 is provided that is coated with a lower cladding layer 12. A hard mask 13 is deposited on top of the lower cladding layer 12. A top view of the hard mask pattern 13 is shown in FIG. 2. An exposed area 14 includes a first end 15 that is wider than a second end 16. The ends 15, 16 are disposed between side sections 17, 18 that taper inwardly toward each other as they extend from the first end 15 to the second end 16. Thus, the hard mask 13 provides a tapered polygonal open area 14 as shown in FIG. 2.

Figure 3:
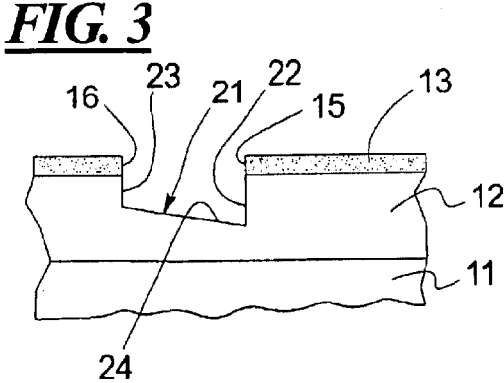
FIG. 3 is a cross-sectional view of the hard mask, lower cladding and substrate shown in FIGS. 1 and 2 after a first reactive ion etching (RIE) step whereby RIE lag is utilized to create a trench that is deeper at the laterally wider end of the open area of the hard mask and shallower at the laterally narrower end of the open area of the hard mask.

Turning to FIG. 3, a RIE process is carried out so as to create a positive RIE lag effect. The RIE lag results in a trench 21 disposed in the lower cladding 12 that includes a first end 22 in matching registry or in general alignment with the first end 15 of the hard mask 13 and a shallower second end 23 in matching registry with the second end 16 of the hard mask. A bottom wall 24 of the trench 21 extends upward as it extends from the first end 22 to the second end 23. The trench 21 also includes side sections (not shown in FIG. 3) that are in matching registry or in general alignment with the side sections 17, 18 of the hard mask 13 (see FIG. 2). Thus, the trench 21 is formed with a wider and deeper first end 22 and a shallower and narrower second end 23. It should be noted that the depth of the end walls 22, 23 will vary depending upon the type of etch system employed.

Figure 4:
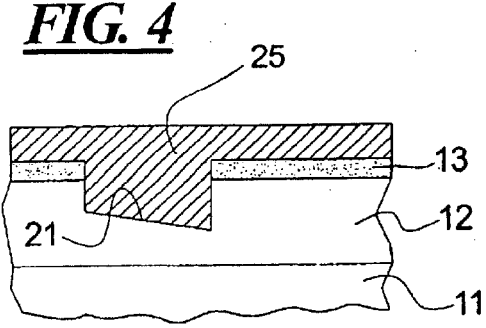
FIG. 4 is a cross-sectional view of the substrate, lower cladding, hard mask and trench shown in FIG. 3 after core material is deposited on top of the hard mask and in the trench.
Figure 5:
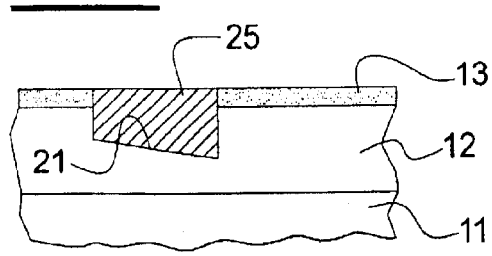
FIG. 5 is a cross-sectional view of the substrate, lower cladding, trench, hard mask and core material shown in FIG. 4 after the core material is planarized to the level of the hard mask.

Turning to FIG. 4, after the trench 21 is formed as shown in FIG. 3, core material 25 is deposited in the trench 21 and on top of the hard mask 13. Then, as shown in FIG. 5, the core material 25 is planarized so that excess portions of the core above the hard mask 13 are removed.

Figure 6A:
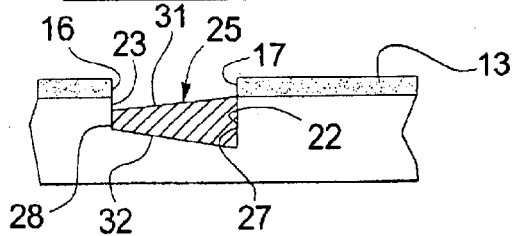
FIG. 6A is a cross-sectional view of the substrate, lower cladding, trench, core and hard mask shown in FIG. 5 after a second RIE process step whereby reverse RIE lag is utilized to etch the core material at a faster rate at the laterally narrower and shallower end of the core and at a slower rate at the laterally wider and deeper end of the core to create a vertically tapered configuration.
Figure 6B:
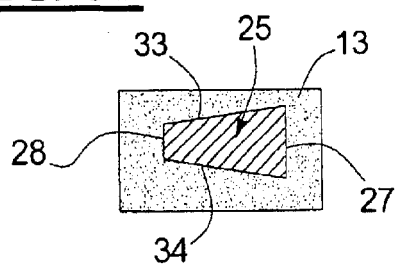
FIG. 6B is a top plan view of the structure shown in FIG. 6A.
Figure 6C:
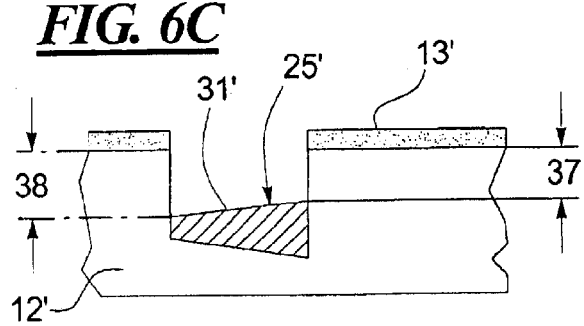
FIG. 6C is a cross sectional view of a substrate, lower cladding, trench, core and hard mask of an alternative embodiment after both etching processes have been carried out.

Then, as shown in FIG. 6A, a second RIE process is carried out so that a reverse RIE lag occurs during the etching of the core material 25. Specifically, the reverse RIE lag results in a faster etching of a shallower and narrower end of the core 25 disposed at the second end 23 of the trench and a slower etching of the core 25 occurs at a wider and deeper end of the core 25 disposed at the deeper and wider first end 22 of the trench. As a result, the core 25 is shaped so that it has a wider and deeper first end 27 and a shallower and narrower second end 28. A top view of the shaped core 25 is shown in FIG. 6B. The resulting core 25 includes a top wall 31 that slopes downward as it extends from the first end 27 to the second end 28 and a bottom wall 32 that slopes upward as it extends from the first end 27 to the second end 28. Similarly, the core 25 includes side sections 33 and 34 that extend laterally inwardly toward each other as they extend from the first end 27 to the second end 28. As shown in FIG. 6C, in an alternative embodiment, the top 31' of the core 25' may be disposed below the hard mask 13' and the depths 37, 38 of the core 25' within the lower cladding 12' will vary depending upon the etch system employed.

Figure 7:
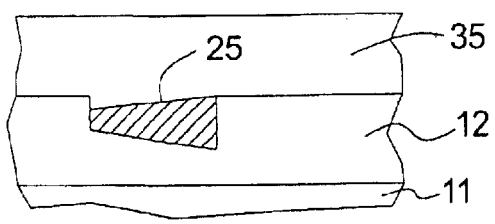
FIG. 7 is a cross-sectional view of the substrate, lower cladding, core material shown in FIG. 6A after the hard mask has been removed and after an upper cladding material has been deposited on top of the core material, trench and lower cladding material.
Figure 8:
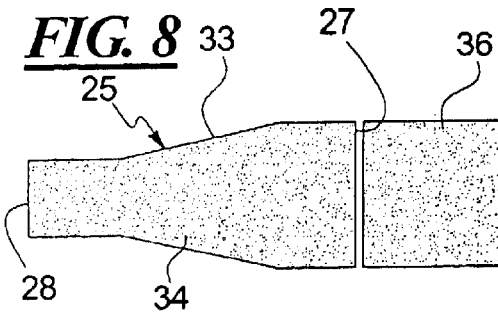
FIG. 8 is a top plan view of the three-dimensional tapered waveguide shown in FIG. 7 as coupled with an optical fiber.

After the second RIE process is carried as shown in FIGS. 6A and 6B, the hard mask 13 is removed and an upper cladding layer 35 is deposited on top of the core 25 and lower cladding layer 12 as shown in FIG. 7. As shown in FIG. 8, the wider and deeper first end 27 of the core 25 is aligned with an optical fiber 36. Also, it will be noted that the core 25 as shown in FIG. 8 and in previous FIGS. 1–7, is not drawn to scale. Specifically, the shallower and narrower second end 28 will typically have a width that varies and the deeper wider end 27 will typically have a width of about 8 $\mu m$ or, more precisely, fall within the range of 8.2 $\mu m$ to 9 $\mu m$ so that the width of the first end 27 of the core 25 matches the diameter of the optical fiber 36 being utilized.

Figure 9:
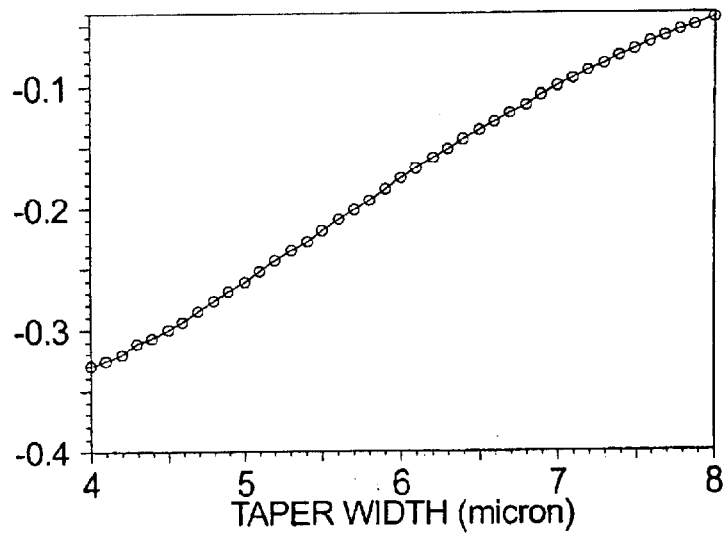
FIG. 9 illustrates, graphically, coupling loss versus width of an optical waveguide at the coupling end for a $SiO_2$ based optical waveguide and a standard, single optical fiber coupling.
Figure 10:
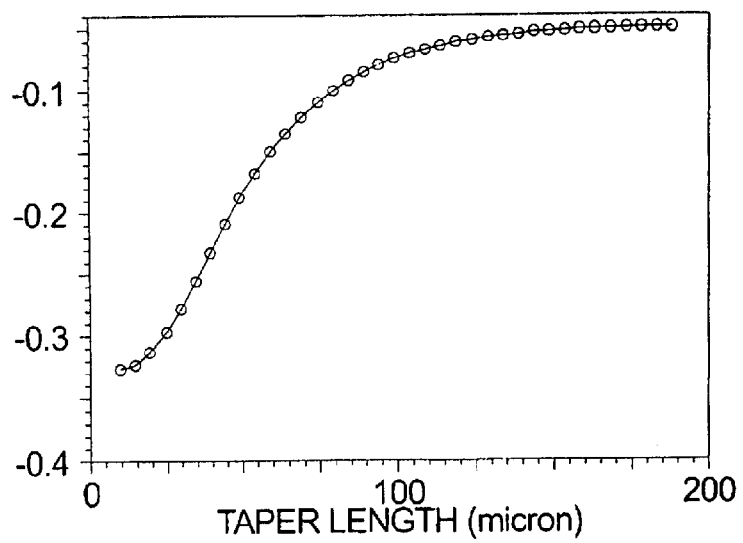
FIG. 10 illustrates, graphically, coupling loss versus length of a three-dimensional tapered optical waveguide for a $SiO_2$ based optical waveguide and a standard, single optical fiber coupling.

Turning to FIG. 9, coupling loss was measured as a function of taper width or the width of a first end 27 of a core 25 for a silica based waveguide and a standard single mode fiber at a 1.55 $\mu m$ wavelength. It will be noted that the coupling loss approaches zero as the taper width approaches 8 $\mu m$. Thus, the preferred width of the first end 27 of the core 25 is about 8 $\mu m$. FIG. 10 illustrates coupling loss as a function of the length of the core 25 or, taper length. It will be noted that the coupling loss approaches zero as the taper length approaches or slightly exceeds 100 $\mu m$. Thus, it is not advantageous to create a core 25 for a silica based waveguide that has a length substantially greater than 100 $\mu m$. Accordingly, a preferred length for the core 25 ranges from about 70 $\mu m$ to about 110 $\mu m$.

Figure 11:
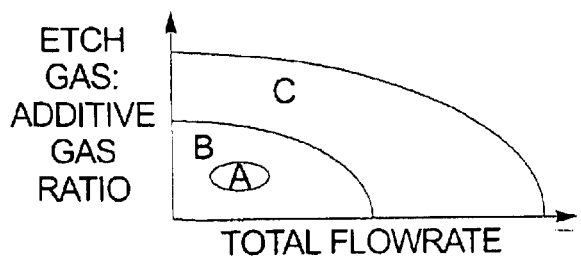
FIG. 11 illustrates, graphically, one means for inducing RIE lag and reverse RIE lag by varying the fluorocarbon:oxygen flow rate ratio and the total flow rate in an etch system where fluorocarbon is the etch gas and oxygen is the additive gas.

By way of an example only, FIG. 11 illustrates one means for inducing RIE lag and reverse RIE lag in a medium-density plasma RIE system utilizing fluorocarbon chemistry. Specifically, the y-axis represents the ratio of the etch gas flow rate, in this case fluorocarbon (e.g., $C_2F_6$, $C_4F_8$, $C_5F_8$, $C_4F_6$, $CHF_3$, etc.) to that of the additive gas flow rate (e.g., oxygen, hydrogen, etc.). The x-axis represents the total or combined flow rate. The ratio of the etch gas flow rate to additive gas flow rate as well as the total flow rate can be used to control the rate of polymerization which inhibits etching. For the example illustrated in FIG. 11, oxygen is the additive gas and can be used to promote polymerization which induces reverse RIE lag. For the region labeled A, the etch rate of a smaller feature is about 1.2 times the etch rate for a larger feature and reverse RIE lag is induced for a low fluorocarbon:oxygen ratio and a low total flow rate. For the region labeled B, where the etch rates of smaller and larger features is about the same and no substantial RIE lag is present. However, for the region labeled C, the etch rate of a smaller feature is about one-half that of a larger feature, RIE lag is present. RIE lag can therefore be induced by increasing the etch gas:additive gas flow rate ratio and/or total flow rate.

Thus, as shown in FIG. 11, the ratio of the etch gas flow rate to the additive gas flow rate as well as the total gas flow rate may be manipulated to induce reverse RIE lag and RIE lag. As noted above, other process parameters may be manipulated to induce either RIE lag or reverse RIE lag. Those process parameters include but are not limited to source power, lower electrode power, ion energy and chamber pressure. Because the way in which these parameters need to be adjusted to either induce RIE lag or reverse RIE lag will depend upon the particular system used, specific parameter values are not given here. However, those skilled in the art will understand, for the particular system being utilized, which process parameter values result in substantial RIE lag or reverse RIE lag because those skilled in the art will have practiced reactive ion etching techniques with parameter values designed to avoid RIE lag and reverse RIE lag. Thus, those skilled in the art will also understand how to utilize process parameters so as to induce RIE lag and reverse RIE lag.

The materials that can used for fabricating the tapered three-dimensional optical waveguides in accordance with this disclosure vary as do the particular reactive ion etching systems. Suitable materials for the lower cladding layer 12, core material 25 and upper cladding layer 35 include, but are not limited to $SiO_2$, SiON, $Si_3N_4$, polymers, $LiNbO_3$ and ferroelectric materials. Variations in the refractive induces of the first cladding layer 12, second cladding layer 35 and core 25 can be obtained using dopants. Thus, the lower cladding layer 12, upper cladding layer 35 and core 25 may all be made from the same family of materials (e.g., $SiO_2$, SiON, $Si_3N_4$, polymers, $LiNbO_3$ or ferroelectric materials) and appropriate variations in the refractive indices can be obtained using appropriate doping techniques which will be apparent to those skilled in the art. Also, materials from different families for the lower cladding layer 12, core 25 and upper cladding layer 35 may be utilized to provide the refractive indices desired. Those skilled in the art will realize that the choice of materials will depend upon the reactive indices desired as well as etching characteristics.

In the foregoing detailed description, the disclosed methods and resulting three-dimensional optical waveguides have been described with reference to exemplary embodiments. It will, however, be evident that various modifications and changes may be made thereto without departing from the broader spirit and scope of this disclosure. The above specification and figures are accordingly regarded as illustrative, rather than restrictive.

What is claimed:

1. A method of fabricating an optical waveguide comprising:

depositing a hard mask on a first cladding layer of a substrate, the hard mask partially covering the first cladding layer while leaving an uncoated area, the uncoated area having a first end and a second end, the first end being wider than the second end;

forming a first trench having first and second ends in general alignment with the first and second ends of the uncoated area and with the first end of the first trench being wider and deeper than the second end of the first trench;

filling the first trench with core material;

forming a second trench in the core material with first and second ends in general alignment with the first and second ends of the first trench and with the second end of the second trench being deeper than the first end of the second trench.

2. The method if claim 1 wherein the forming of the first trench is carried out by reactive ion etching the uncoated area under conditions sufficient to permit RIE lag to occur; and the forming of the second trench is carried out by reactive ion etching the core material under conditions sufficient to permit reverse RIE lag to occur.

3. The method of claim 1 further comprising:

removing the hard mask.

4. The method of claim 1 further comprising planarizing the core material after filling the first trench with the core material and prior to the reactive ion etching of the core material.

5. The method of claim 2 wherein the reactive ion etching of the uncoated area is carried out in a chamber with a first source power and the reactive ion etching of the core material is carried out in the chamber with a second source power, the first source power being different than the second source power.

6. The method of claim 2 wherein the reactive ion etching of the uncoated area is carried out in a chamber at a first pressure and the reactive ion etching of the core material is carried out in the chamber at a second pressure, the first pressure being different than the second pressure.

7. The method of claim 2 wherein the reactive ion etching of the uncoated area is carried out in a chamber at a first ion energy and the reactive ion etching of the core material is carried out in the chamber at a second ion energy, the first ion energy being different than the second ion energy.

8. The method of claim 2 wherein the reactive ion etching of the uncoated area is carried out with a first ratio of etch gas flow rate to additive gas flow rate and the reactive ion etching of the core material is carried out with a second ratio of etch gas flow rate to additive gas flow rate, the first ratio being different from the second ratio.

9. The method of claim 2 wherein the reactive ion etching of the uncoated area is carried out with a first total flow rate of etch gas and additive gas and the reactive ion etching of the core material is carried out with a second total flow rate of etch gas and additive gas, the first total flow rate being different than the second total flow rate.

10. The method of claim 9 wherein the reactive ion etching of the uncoated area is carried out with a first total flow rate of etch gas and additive gas and the reactive ion etching of the core material is carried out with a second total flow rate of etch gas and additive gas, the first total flow rate being different than the second total flow rate.

11. The method of claim 2 wherein the reaction ion etching of the uncoated area is carried out using a first lower electrode power and the reactive ion etching at the core material is carried out using a second lower electrode power, the first lower electrode power being different than the second lower electrode power.

12. The method of claim 1 wherein the first cladding layer is selected from the group consisting of $SiO_2$, SiON, $Si_3N_4$, $LiNbO_3$, polymers, and ferroelectric materials.

13. The method of claim 12 wherein the core material is selected from the group consisting of $SiO_2$, SiON, $Si_3N_4$, $LiNbO_3$, polymers, and ferroelectric materials.

14. The method of claim 1 further comprising depositing a second cladding layer on top of the core and first cladding layer after removing the hard mask.

15. The method of claim 14 wherein the second cladding layer is selected from the group consisting of $SiO_2$, SiON, $Si_3N_4$, $LiNbO_3$, polymers, and ferroelectric materials.

16. The method of claim 15 wherein the core comprises a first polymer and the second cladding layer comprises a second polymer, the first and second polymers having differing refractive indices.

17. The method of claim 1 wherein the core comprises a first doped silica and the second cladding layer comprises a second doped silica, the first and second doped silicas having differing refractive indices.

18. A three-dimensional optical waveguide comprising:

a substrate coated with a first cladding layer, the first cladding layer comprising a three dimensional trench having a peripheral boundary including a first end and a second end, the first end of the trench being wider and deeper than the second end of the trench, the trench being disposed entirely within the first cladding layer with a portion of the first cladding disposed between the trench and the first substrate, the trench being partially filled with core material so that a height of the core material at the first end of trench is greater than a height of the core material at the second end of the trench, the core material and first cladding layer being covered by a second cladding layer.

19. The optical wave guide of claim 18 further comprising an optical fiber having an end connected to the first cladding layer and aligned with the first end of the trench.

20. The optical wave guide of claim 19 wherein optical fiber has a diameter ranging from about 8 $\mu$m to about 9 $\mu$m and a width of the first end of the trench ranges from about 8 $\mu$m to about 9 $\mu$m.

21. The optical wave guide of claim 20 wherein the diameter of the fiber substantially matches the width of the first end of the trench.

22. The optical wave guide of claim 18 wherein the core comprises a first polymer and the second cladding layer comprises a second polymer, the first and second polymers having differing refractive indices.

23. The optical wave guide of claim 18 wherein the core comprises a first doped silica and the second cladding layer comprises a second doped silica, the first and second doped silicas having differing refractive indices.

24. A method of fabricating an optical waveguide comprising:

depositing a hard mask on a first cladding layer of a substrate, the hard mask partially covering the first cladding layer while leaving an uncoated area, the uncoated area having a peripheral boundary including a first end and a second end, the first end being wider than the second end;

reactive ion etching the uncoated area under conditions sufficient to permit RIE lag to occur so as to form a first trench having first and second ends in general alignment with the first and second ends of the uncoated area and with the first end of the first trench being deeper than the second end of the first trench;

filling the first trench with core material;

planarizing the core material;

reactive ion etching the core material under conditions sufficient to permit reverse RIE lag to occur so as to form a second trench in the core material with first and second ends in general alignment with the first and second ends of the first trench and with the second end of the second trench being deeper than the first end of the second trench;

removing the hard mask;

coating the core and first cladding layer with a second cladding layer.

25. The method of claim 24 wherein the reactive ion etching of the uncoated area is carried out in a chamber with a first source power and the reactive ion etching of the core material is carried out in the chamber with a second source power, the first source power being different than the second source power.

26. The method of claim 24 wherein the reactive ion etching of the uncoated area is carried out in a chamber at a first pressure and the reactive ion etching of the core material is carried out in the chamber at a second pressure, the first pressure being different than the second pressure.

27. The method of claim 24 wherein the reactive ion etching of the uncoated area is carried out in a chamber at a first ion energy and the reactive ion etching of the core material is carried out in the chamber at a second ion energy, the first ion energy being different than the second ion energy.

28. The method of claim 24 wherein the reactive ion etching of the uncoated area is carried out with a first ratio of etch gas flow rate to additive gas flow rate and the reactive ion etching of the core material is carried with a second ratio of etch gas flow rate to additive gas flow rate, the first ratio being different from the second ratio.

29. The method of claim 24 wherein the reactive ion etching of the uncoated area is carried out with a first total flow rate of etch gas and additive gas and the reactive ion etching of the core material is carried out with a second total flow rate of etch gas and additive gas, the first total flow rate being different than the second total flow rate.

30. The method of claim 24 wherein the reaction ion etching of the uncoated area is carried out using a first lower electrode power and the reactive ion etching at the core material is carried out using a second lower electrode power, the first lower electrode power being different than the second lower electrode power.

* * * * *

UNITED STATES PATENT AND TRADEMARK OFFICE
CERTIFICATE OF CORRECTION

PATENT NO. : 6,760,529 B2
DATED : July 6, 2004
INVENTOR(S) : Gabel Chong et al.

It is certified that error appears in the above-identified patent and that said Letters Patent is hereby corrected as shown below:

Column 7,
Line 17, please delete "if" and replace with -- of --.

Signed and Sealed this

Twenty-first Day of December, 2004

JON W. DUDAS
*Director of the United States Patent and Trademark Office*